Inventor
THOMAS G. MOORE
By Herman L. Gordon
ATTORNEY

Feb. 17, 1953 T. G. MOORE 2,628,872
FLUID PRESSURE INTENSIFIER
Filed Feb. 5, 1948 2 SHEETS—SHEET 2
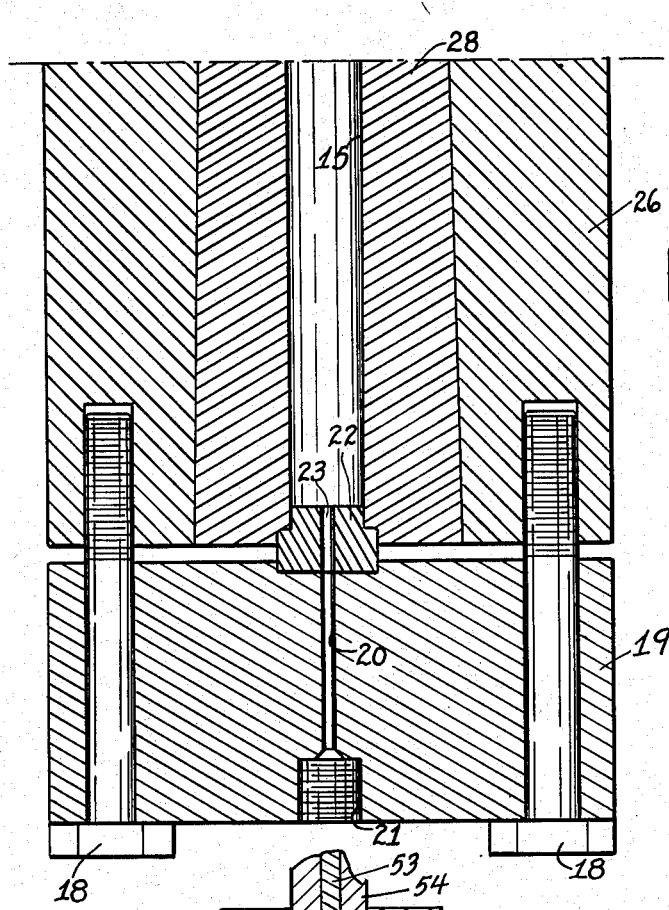
FIG.2
FIG.3  FIG.4
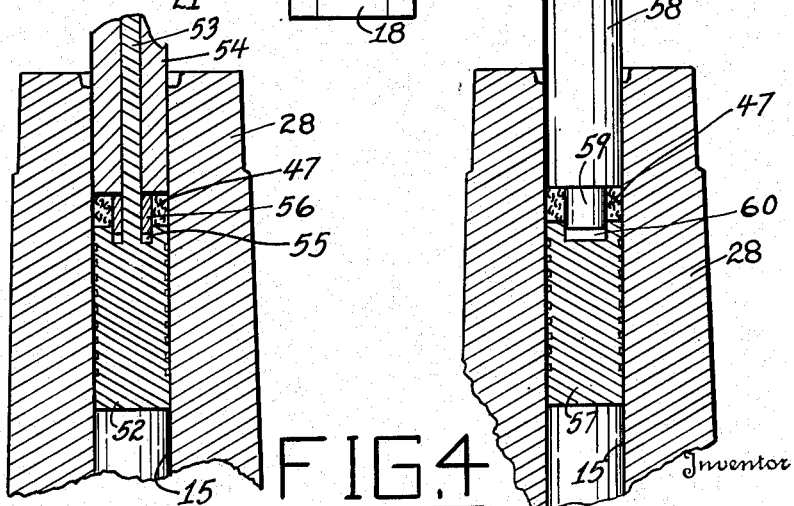
Inventor
THOMAS G. MOORE
By Herman L. Gordon
ATTORNEY Patented Feb. 17, 1953

2,628,872

UNITED STATES PATENT OFFICE 2,628,872

FLUID PRESSURE INTENSIFIER

Thomas G. Moore, Takoma Park, Md., assignor to American Instrument Company, Inc., Silver Spring, Md.

Application February 5, 1948, Serial No. 6,539

5 Claims. (Cl. 309—8)

This invention relates to devices for creating high fluid pressures, and more particularly to a high pressure device of the piston type.

A main object of the invention is to provide a novel and improved pressure intensifying device of the piston type employing deformable packing as the sealing means between the high pressure piston and its cylinder, the device being arranged so that excessive friction cannot develop between the packing and said cylinder, whereby the operation of the high pressure piston remains substantially normal even at pressures in the neighborhood of 100,000 pounds per square inch.

A further object of the invention is to provide an improved pressure creating device of the piston type employing deformable packing as the sealing means between the high pressure piston and its cylinder, wherein the amount of compression exerted by the high pressure piston on the packing is positively limited to a predetermined value, thus preventing excessive friction from building up between said packing and said cylinder and reducing wear on the packing.

A still further object of the invention is to provide an improved fluid pressure intensifier of the piston type employing deformable packing, which will operate satisfactorily at very high pressures, such as pressures of the order of 100,000 pounds per square inch without having the high pressure piston stick in its cylinder because of friction developed by the compression of the packing, wherein wear on the packing is controlled, and wherein means is provided for lubricating the high pressure piston at all times.

Further objects and advantages of the invention will become apparent from the following description and claims, and from the accompanying drawings, wherein:

Figure 2 is a vertical cross-sectional view taken through the lower portion of the fluid pressure intensifier of Figure 1.

Figure 3 is a detail vertical cross-sectional view illustrating a modification of the means for controlling the amount of compression on the high pressure piston packing, in accordance with the present invention.

Figure 4 is a detail vertical cross-sectional view illustrating still another modification of the compression-controlling means for the high pressure piston packing according to this invention.

Figure 1:
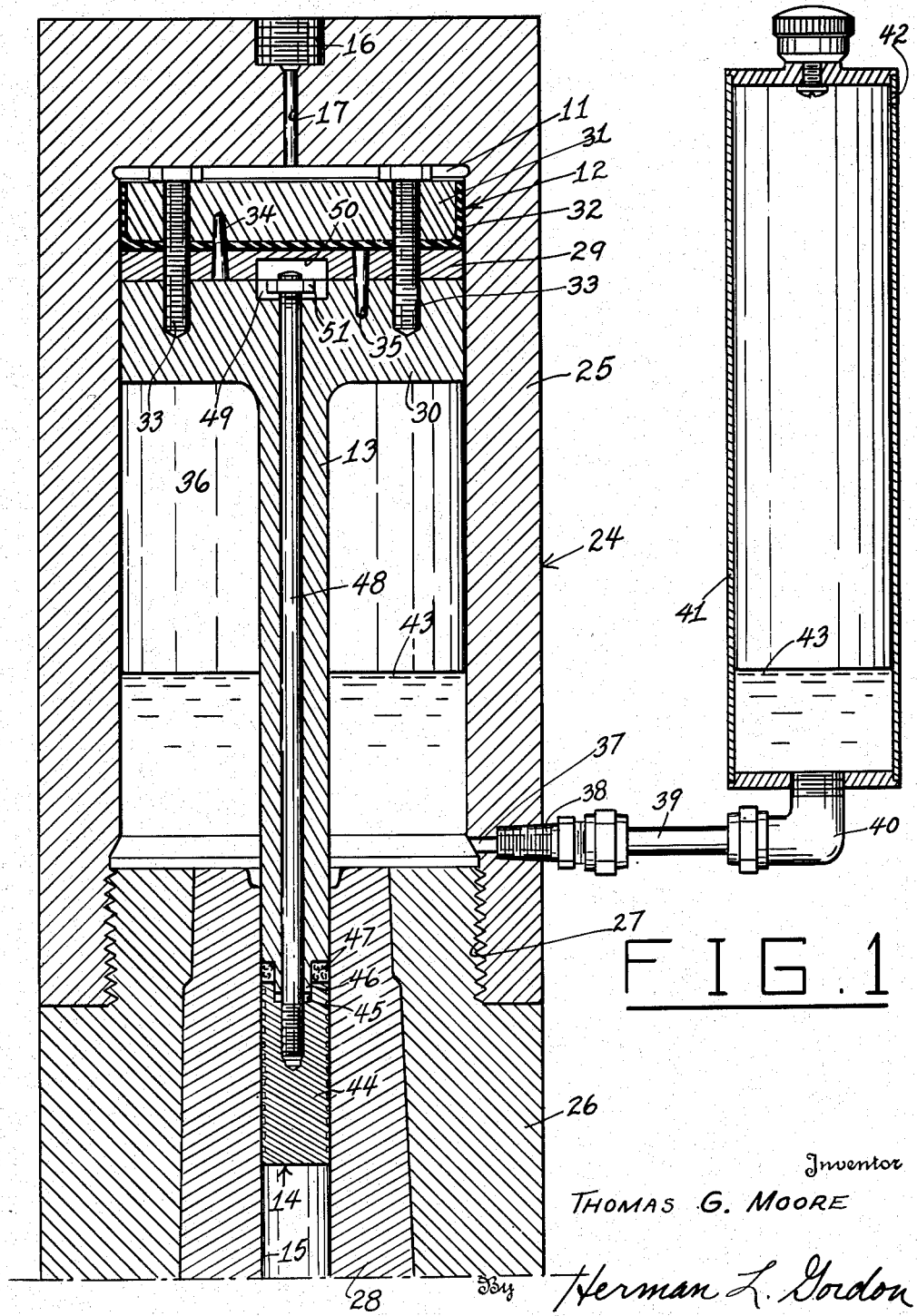
Figure 1 is a vertical cross-sectional view taken through the upper portion of a fluid pressure intensifier constructed in accordance with the present invention.

Referring to the drawings, the pressure intensifying device comprises a low pressure cylinder 11 in which is provided a low pressure piston 12 connected to a piston rod 13, a high pressure piston 14, and a high pressure cylinder 15 in which piston 14 operates. Cylinder 11 is formed with a threaded end bore 16 and with a passage 17 connecting bore 16 to the interior of the cylinder. A suitable fitting is connected to threaded bore 16 through which oil or other fluid is admitted into cylinder 11. Connected by bolts 18, 18 to the body of the device at the end of cylinder 15 is a block or head 19 formed with an axial bore 20 which terminates in an internally threaded enlarged bore portion 21. Seated in the end of cylinder 15 is a steel gasket collar 22 having an axial passage 23 which connects the interior of cylinder 15 to the bore 20. A suitable conduit fitting is connected to internally threaded bore 21, through which oil or other fluid under high pressure leaves cylinder 15.

The body of the device is designated generally at 24 and comprises an upper section 25 and a lower section 26 threadedly secured at 27 to said upper section. The low pressure cylinder is in the upper portion of section 25. The high pressure cylinder 15 is defined by an alloy steel tapered liner 28 which is pressed into the lower body section 26. The bolts 18, 18 act on the block 19 to exert sealing pressure on the steel gasket collar 22 to thereby insure a leak-proof joint between cylinder liner 28 and block 19.

Piston 12 is fitted with a plate 29. The main body of piston 12 is indicated at 30. Piston 12 includes a plate 31 received in a cup 32 of deformable packing material. Bolts 33, passing through plate 31, cup packing 32, and plate 29, are threaded into piston body 30 and secure the parts of the piston 12 in assembled relationship. Plate 29 carries oppositely projecting locating pins 34 and 35 which are received respectively in recesses formed in plate 31 and piston body 30.

The space below piston body 30 is designated at 36. Space 36 is connected through a passage 37 and fitting 38 at the lower end of space 36 to a conduit 39. Conduit 39 is connected by a fitting 40 to the bottom of an oil reservoir 41. The upper end portion of the side wall of reservoir 41 is formed with a vent opening 42, exposed to atmosphere. Oil reservoir 41 contains a quantity of oil, shown at 43, which may flow into space 36 through conduit 39.

Cup packing 32 prevents oil in cylinder 11 from leaking past piston 12 into space 36, which is at substantially atmospheric pressure at all times because it is vented through conduit 39, reservoir 41 and vent opening 42 to atmosphere. There may be a slight deviation from atmospheric pressure in space 36 due to the differential in hydrostatic head between the liquid 43 in space 36 and that in reservoir 41.

High pressure piston 14 comprises a piston cap 44 formed at its top end with a counterbore 45. Piston rod 13 is formed with an end stud 46 which is slidably received in counterbore 45. Encircling end stud 46 and positioned in the space between the piston rod 13 and piston cap 44 is soft packing 47. Threaded axially into piston cap 44 and passing slidably through an axial bore in piston rod 13 is a tie rod 48. The central portions of the opposing faces of piston body 30 and plate 29 are formed with respective opposing counterbores 49 and 50 defining a cavity. The end of tie rod 48 projects into this cavity, and threaded onto the tie rod is a nut 51. The cavity is of substantial size, so that a certain amount of axial movement of piston 12 with respect to tie rod 48 may take place.

If oil or other fluid is pumped into cylinder 11 through the connection at 16 and passage 17, piston rod 13 and piston 12 will move in the direction which increases the volume of cylinder 11 and decreases the volume of cylinder 15. Decreasing the volume of cylinder 15 causes the fluid contained therein to flow out of the intensifier through passage 20 and the connection at 21. The area of piston 12 is greater than the area of piston 14. Therefore, if there were no friction in the system, the pressure created in cylinder 15 would be equal to the pressure impressed on cylinder 11 multiplied by the ratio of the area of piston 12 to the area of piston 14.

There is, however, considerable friction in packing 32 of piston 12 and packing 47 of piston 14. Fluid from cylinder 11 exerts a pressure on the cylindrical inner surface of deformable packing cup 32 and forces it tightly against the wall of cylinder 11, causing friction between cup 32 and said cylinder wall. Fluid in cylinder 15 exerts an axial thrust on piston cap 44, which in turn compresses packing 47 between cap 44 and piston 13. As a result of this compression, packing 47 exerts a lateral thrust against the wall of cylinder 15. The effect of this side thrust is to seal cylinder 15, but the friction may be so great that it prevents all motion of the pistons at pressures in excess of 60,000 pounds per square inch in cylinder 15.

To avoid excess friction in packing 47, the prior art has employed soft slippery packings which wear out and must be replaced after several strokes of the intensifier. In order to obtain an intensifier which may be used continuously at pressures up to 100,000 pounds per square inch without the necessity of replacing packing 47 after several strokes, and in order to prevent excessive friction between the packing 47 and the wall of cylinder 15, the amount of compression which piston cap 44 exerts on packing 47 is limited by the provision of stud 46 which is slidably engaged in the counterbore 45 of piston cap 44. The initial compression on packing 47 is determined by the adjustment fo nut 51. Nut 51 may be adjusted so that there is a relatively small amount or no compression on packing 47 prior to the compression stroke of the intensifier. During the compression stroke, when the end of stud 46 engages the bottom of counterbore 45, the piston cap 44 can exert no more compression on packing 47 and therefore the friction between said packing and the wall of cylinder 15 is limited.

In the embodiment of the invention shown in Figure 3, the high pressure piston head is designated at 52 and is formed integrally with a tie rod 53 extending axially and slidably through the piston rod, which is designated at 54. Piston rod 54 is connected to low pressure piston 12 in the same manner as in the previously described embodiment of the invention. Piston 52 is formed with a counterbore 55 around tie rod 53. Encircling tie rod 53 and slidable in counterbore 55 is a sleeve member 56. The packing 47 surrounds the sleeve member 56 in the space between piston rod 54 and piston head 52. A nut 51 is threaded on the top end of tie rod 53 in the same manner as in Figure 1. In the embodiment of Figure 3, compression on the packing 47 is limited by the engagement of the lower end of sleeve member 56 with the bottom of the counterbore 55 during the compression stroke of the intensifier.

In the embodiment of the invention illustrated in Figure 4, the high pressure piston head is designated at 57 and floats freely in the high pressure cylinder 15. The piston rod is designated at 58 and is connected to the piston 12 in the same manner as in the previously described embodiments of the invention. The lower end of piston rod 58 is formed with a stud member 59 which is slidably received in a bore 60 formed in the top of piston head 57. The packing 47 encircles stud member 59. Compression on the packing 47 is limited by the engagement of the lower end of stud member 59 with the bottom of bore 60.

Since packing 47 tends to wipe all lubricant from the walls of cylinder 15, said walls must be lubricated by fluid other than that used for the transmission of hydraulic pressure. The reservoir 41 provides the additional required lubricant. The oil 43 from reservoir 41 enters the space 36 through the conduit 39, fitting 38, and passage 37. The oil 43 partially fills space 36, and as the piston rod moves axially in said space it becomes coated with oil. As said piston rod moves downwardly into the high pressure cylinder 15, some of this oil is carried into the clearance space between liner 28 and the piston rod. When the piston rod moves up again the load on packing 47 is relieved and said packing does not wipe the oil out of said clearance space. This oil works down into the space between the liner 28 and the high pressure piston head and is trapped in oil grooves provided on said piston head. There is therefore always a certain amount of lubricating oil present to lubricate the piston and the piston head.

While certain specific embodiments of a fluid pressure intensifying device have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a fluid pressure intensifier of the piston type having a high pressure cylinder and an oil reservoir located above the cylinder, a piston slidably and sealingly engaging in said cylinder, a piston rod slidably engaging in said cylinder, said piston being formed with an axial bore facing the end of said piston rod, a tie rod rigidly secured axially to said piston and extending slidably axially through said piston rod, means on the end of the tie rod opposite the piston engageable with the end of the piston rod and arranged to allow limited axial movement of the tie rod with respect to said piston rod, abutment means movable with the end of said piston rod slidably into said axial bore and being greater in length than the depth of said bore, and deformable packing surrounding said abutment means and arranged to sealingly engage the cylinder wall adjacent said piston and to seal the piston relative to said piston rod on the compression stroke of the piston and to release the packing at other times to allow oil to flow from the reservoir to the cylinder wall adjacent the piston.

2. The structure of claim 1, and wherein said abutment means comprises a sleeve element encircling said tie rod.

3. The structure of claim 1, and wherein said abutment means comprises a sleeve-like extension on the end of said piston rod slidably fitting said bore.

4. The structure of claim 1, and wherein said abutment means comprises a sleeve encircling the tie rod adjacent the end of the piston rod and slidably fitting said bore, the sleeve being separable from the piston rod.

5. The structure of claim 1, and wherein the tie rod is threadedly secured axially to said piston and said piston is solid for a substantial portion of its length.

THOMAS G. MOORE.

REFERENCES CITED

The following references are of record in the file of this patent:

UNITED STATES PATENTS

| Number | Name | Date |
|---|---|---|
| 994,558 | Aspinwall | June 6, 1911 |
| 1,038,524 | Bossert | Sept. 17, 1912 |
| 1,343,836 | Lewis | June 15, 1920 |
| 1,828,874 | Myers | Oct. 27, 1931 |
| 1,958,722 | Sinclair | May 15, 1934 |
| 2,319,950 | Schleicher | May 25, 1943 |
| 2,392,123 | De la Roza | Jan. 1, 1946 |
| 2,452,292 | Cousino | Oct. 26, 1948 |